J. P. RANCK.
PULLEY ATTACHMENT FOR AUTOMOBILE WHEELS.
APPLICATION FILED OCT. 12, 1915.
1,179,036.  
Patented Apr. 11, 1916.
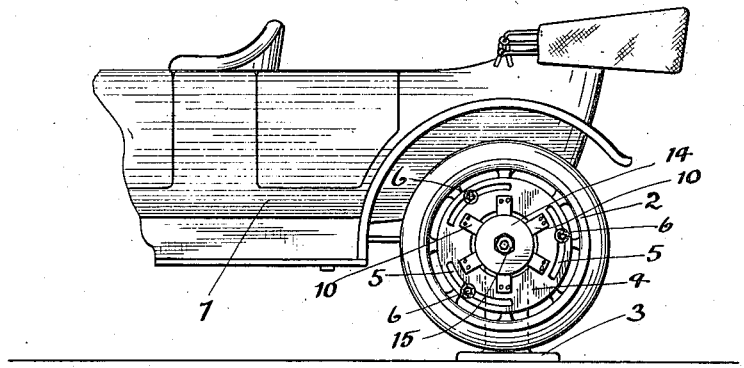
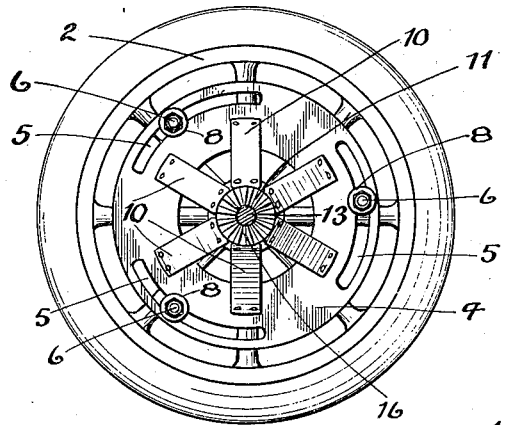
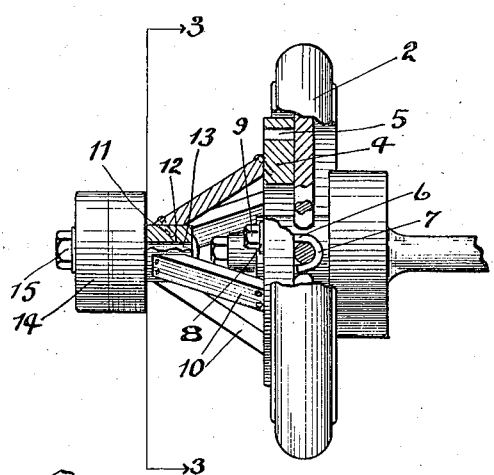
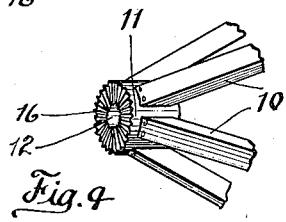
Inventor  
Jessee Paul Ranck

UNITED STATES PATENT OFFICE.

JESSEE PAUL RANCK, OF SYCAMORE, OHIO.

PULLEY ATTACHMENT FOR AUTOMOBILE-WHEELS.

1,179,036.  Specification of Letters Patent.  Patented Apr. 11, 1916.

Application filed October 12, 1915. Serial No. 55,539.

*To all whom it may concern:*

Be it known that I, JESSEE PAUL RANCK, a citizen of the United States, residing at Sycamore, in the county of Wyandot and State of Ohio, have invented certain new and useful Improvements in Pulley Attachments for Automobile-Wheels, of which the following is a specification.

My invention relates to pulley attachments for automobile wheels and is designed particularly as an attachment which may be readily applied to one of the rear wheels of a motor vehicle to supply power or driving energy to any type of machine desired. My invention is particularly useful on farms wherein the motor vehicle may be used to drive small farm machinery ordinarily employing hand power in their operation, or individual engines.

The main object of my invention resides in the provision of a structure of the type above referred to, wherein the driving pulley is spaced out to one side a considerable distance so as not to interfere with the body portion of the vehicle and further so that the belt or other driving medium connecting the same, may be run at any angle desired without engaging the fenders and other protrusions from the vehicle body.

The preferred embodiment of my invention is shown in the accompanying sheet of drawings, in which similar characters of reference designate corresponding parts, and in which:

Figure 1 shows the application of my invention to one of the rear wheels of an automobile, Fig. 2 is a view in side elevation of my attachment shown applied to a wheel, portions being broken away for purposes of clearness, Fig. 3 is a section taken on line 3—3 of Fig. 2, and, Fig. 4 is a detail view in perspective of the hub portion of my attachment showing the pulley removed.

In these drawings, a portion of an automobile only is shown at 1 and one of the rear wheels 2 of this automobile is shown as jacked up from the ground to allow it to run freely by means of the jack shown at 3.

My invention proper comprises an annular base member 4 formed with a plurality of arcuate slots 5. These slots are provided to adjustably receive attaching bolts 6, which bolts have their inner ends bent to U-shape as is shown at 7 to firmly embrace the spokes of the wheel and their outside ends are provided with washers 8 which are then clamped into firm holding engagement by tightening of the nuts 9. Thus, by the provision of the arcuate slots 5, this annular member 4 may be adapted to various makes and types of wheels, since the adjustment afforded is sufficient to bring the attaching bolts into holding engagement with the spokes of the supporting wheel. In order that the driving pulley, sprocket or gear or whatever may be used, may be located in a position out to one side of the wheel a considerable extent, I have attached to this base member a plurality of outwardly extending frame pieces 10, which frame pieces are securely fastened at one end to the base member 4 and in addition to extending outwardly, also are all inclined toward each other and are attached at their forward ends to a hub shown at 11. This hub is centrally bored, as is shown at 12, through which bore the bolt 13 is designed to pass, this bolt being used for the purpose of securely holding a pulley or other driving member 14 in its applied position by tightening of the nut shown at 15. It will be noted by reference particularly to Fig. 4 that the outside face of this hub 11 is roughened as is indicated at 16 so that when the nut 15 is tightly drawn up, the hub of the pulley 14 will be made to bear against this roughening 16 and in this manner relative rotation between the pulley 14 and the hub 11 is guarded against when the vehicle wheel is turning under load.

From the foregoing description, it will be apparent that I have provided an attachment wherein the pulley 14 is located to one side of the vehicle to some considerable extent and in this manner the driving belt or chain as the case may be, does not engage the fenders or the like of the vehicle to cause their disfigurement. Likewise, by means of the outwardly extending frame pieces 10, a very rigid construction is produced and in view of the roughened face 16 and the bolt 13, the pulley 14 is securely held in position to guard against any slippage. It will also be understood that by unscrewing the nut 15, the pulley 14 may be removed and one of a different size may be substituted as the occasion may demand.

What I claim is:

A pulley attachment for automobile wheels comprising an annular base member having a series of arcuate slots, bolts passing through said slots arranged to form the means of attachment to the spokes of an automobile wheel, a plurality of outwardly extending frame pieces carried by said member, said frame pieces all being inclined toward each other, a centrally bored hub carried by the outer ends of said frame pieces, a centrally bored pulley, and a bolt and nut structure for bolting said hub and said pulley together, the contacting hub and pulley faces being roughened to prevent relative rotation between them.

In testimony whereof I affix my signature in presence of two witnesses.

JESSEE PAUL RANCK.

Witnesses:
 WALTER E. S. BOCK,
 A. L. PHELPS.